Feb. 5, 1957     D. McKINLAY, JR     2,780,097
COLD-END COMPENSATOR FOR MUTIPLE-POINT PYROMETERS
Filed May 29, 1953     2 Sheets-Sheet 1
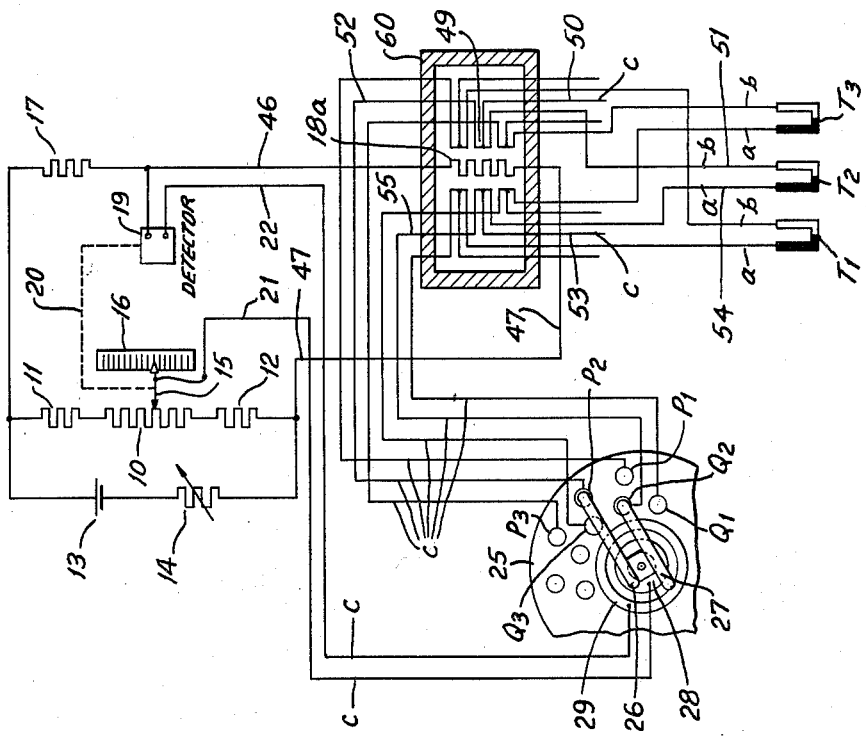
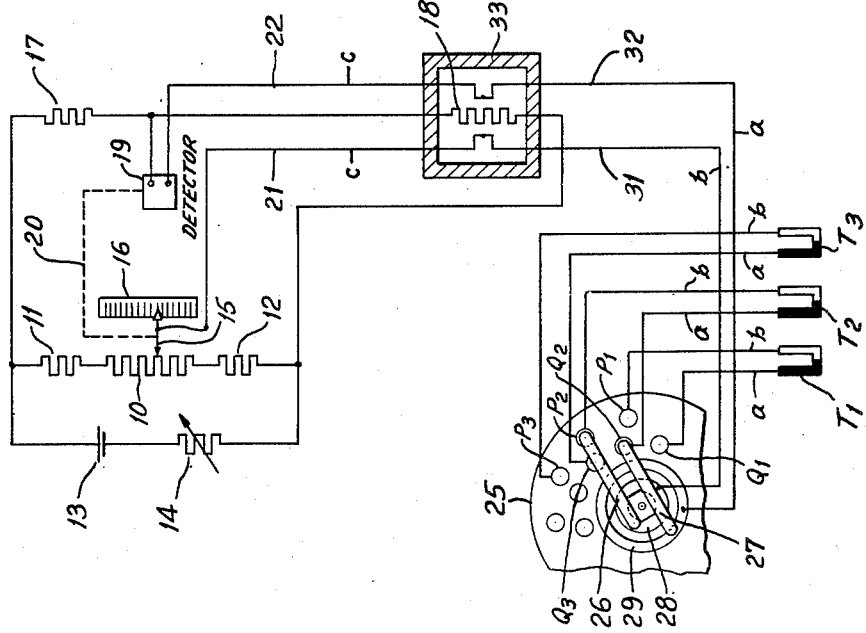

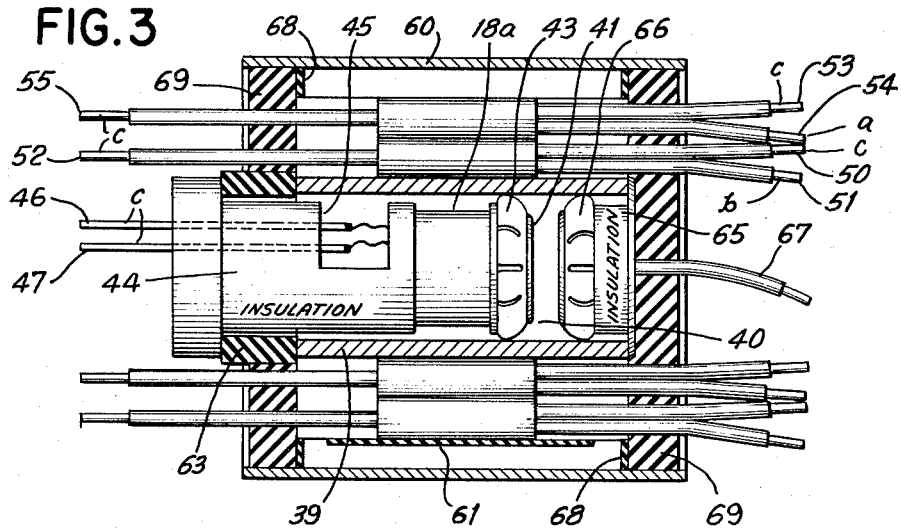
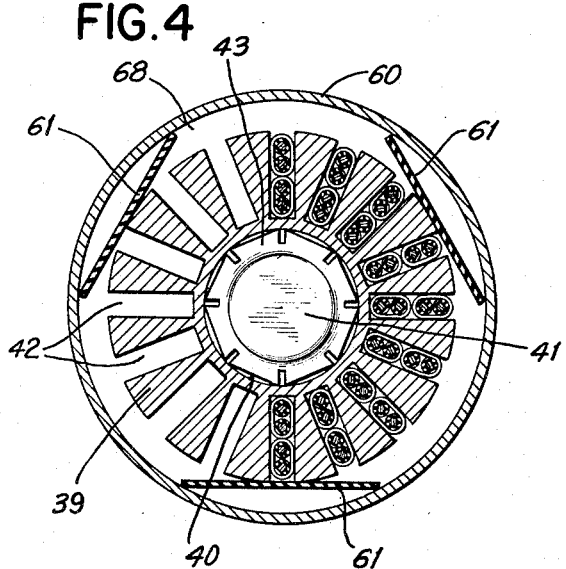
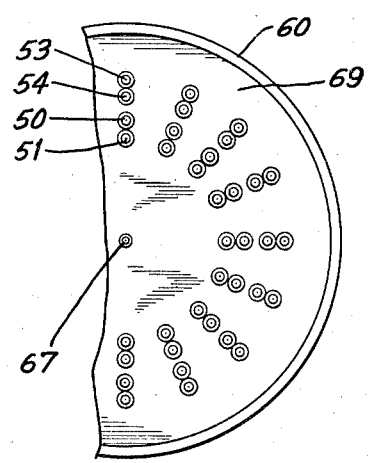
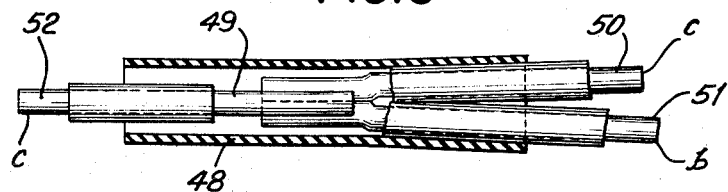

United States Patent Office 2,780,097
Patented Feb. 5, 1957

2,780,097

COLD-END COMPENSATOR FOR MULTIPLE-POINT PYROMETERS

Donald McKinlay, Jr., Bethany, Conn., assignor to The Bristol Company, Waterbury, Conn., a corporation of Connecticut Application May 29, 1953, Serial No. 358,459

5 Claims. (Cl. 73—361)

This invention relates to apparatus for measuring temperature according to the thermoelectric principle, and more especially to means for effecting cold-end temperature compensation in thermoelectric pyrometers of the multiple-point class. It is a well known fact that, since the electromotive force developed in a thermoelectric circuit is a function of the difference between the temperatures of the two junctions comprising that circuit, determination of the actual temperature of one of said junctions requires either that the other be maintained at a predetermined known temperature or that there be introduced into the measuring system some means whereby to effect a compensation for the temperature of the reference junction, or "cold end" and render the net effect of the electromotive force set up in the measuring junction, or "fire end," a function of temperature as measured from a fixed datum point on the scale.

In practical applications of the thermoelectric principle to the measurement of temperature, numerous expedients have been devised for the purpose of effecting what is commonly known as "cold-end compensation"; and the nature of these is to some extent governed by the manner in which the electromotive force in the circuit is determined. If a direct-deflecting millivoltmeter is employed, the compensation may be mechanically effected by the use of a bimetallic temperature sensitive adjustment attached to a spring abutment in the instrument. Such a device is fully disclosed in U. S. Letters Patent No. 1,288,019, granted to M. J. Johnson, December 17, 1918. As an alternative, the compensation may be electrically effected by temperature-responsive means for modifying the characteristics of an electrical network in which the millivoltmeter is included. Examples of such compensations are shown in U. S. Patents 1,228,678 and 1,228,803, granted June 5, 1917, to M. J. Johnson and G. Mertelmeyer, respectively. Where measurement of the electromotive force in the thermoelectric circuit is performed by a null-type circuit, or potentiometer, it is customary as in said last-named Johnson patent to insert a temperature-sensitive bridge network in the measuring system, whereby to shift the zero of reference in response to changes in the temperature to which the "cold junction" is exposed. Such compensations are described in U. S. Bureau of Standards Technical Paper 170, "Pyrometric Practice," 1921, page 59, and will hereinafter be more fully discussed.

In order to fully realize the benefit of a cold-end compensator it is essential that equality of temperature be maintained between the reference junction and the compensating element which varies its characteristic with changes in temperature to which said junction is exposed; and for this result to be achieved it is customary where practicable to maintain these parts in intimate thermal association. Where a potentiometric system is used in determination of temperature as represented by the electromotive force of a single measuring couple, it is possible to provide electrical, and incidentally, thermal, connection between said parts by soldering or by other positive metal-to-metal integration; but in a multiple-point temperature system it is not practicable that such electrical interconnection be maintained. The problem then becomes one of providing a common compensation for a plurality of cold junctions, and of maintaining these and the responsive element at a common temperature value.

It is an object of the present invention to provide means for compensating a thermoelectric measuring circuit for the temperature of the reference junction included therein.

It is a further object to provide means of the above nature which shall be especially adaptable to use in a multiple-point system wherein the temperatures of a plurality of thermocouples are individually determined with a common measuring apparatus.

It is a further object to provide means of the above nature which shall inherently eliminate spurious electromotive forces due to temperature gradients in the multiple-point selector.

It is a further object to provide a mechanical structure whereby to minimize possible temperature difference between the reference junctions and the compensating means.

It is a further object to provide means of the above nature which shall facilitate maximum flexibility in selection of thermocouple materials in the measuring elements.

It is a further object to provide means of the above nature wherein a set of measuring couples of one selected material combination may be substituted for another without the need for structural changes in the measuring instrument.

It is a further object to provide means of the above nature wherein the compensating device may readily be maintained at ground, or at any other desired electrical potential.

It is a further object to provide means of the above nature which shall be rugged in structure, permanent in its characteristics, inexpensive to build, and readily adaptable to production on a quantity basis.

In carrying out the purposes of the invention, it is proposed to provide a compensating device comprising a temperature-sensitive resistance element adapted to incorporation into the measuring network, together with a plurality of "cold junctions," one for each measuring thermocouple, and to include means for maximum temperature equalization among said resistor and said junctions, together with means for minimizing the effect of ambient temperature variations upon said compensating device.

As a corollary to the above-proposed arrangement there is rendered possible a circuit arrangement wherein it is unnecessary to associate thermoelectrically dissimilar metals with the multiple-point switch.

It is further proposed to include in the reference junctions "extra" conductors formed of metals which may alternatively be included in the measuring circuit, thus rendering possible a selection of measuring couples comprised of those materials.

In the drawings:

Figs. 1 and 2 are diagrams of similar measuring circuits each incorporating a plurality of thermocouples and a multiple point dial switch, Fig. 1 illustrating the prior art, and Fig. 2 the manner of applying the principles of the invention to said circuit.

Figs. 3 and 4 are sectional side, and end, views, respectively of a compensating device embodying the principle of the invention.

Fig. 5 is an end elevation of the same.

Fig. 6 shows to an enlarged scale a detail of the structure illustrated in Figs. 3 and 4.

In Figs. 1 and 2, which show respectively the prior art and the present invention in its application to a multiple-point thermocouple pyrometer of the potentiometer type, attention may first be given to the bridge network which forms an identical component of both embodiments. A series combination of a slide-wire resistor 10 with range determining resistors 11 and 12 at its respective extremities is connected for energization from a battery or equivalent D.-C. source 13 through a rheostat 14 whereby the current through, and hence the potential drop across, said slide-wire may be adjusted to a predetermined standard value. Translatably associated with the slide-wire 10 is a contact member 15 having a juxtaposed graduated scale 16 whereby to provide an indication of the translated position of said contact member with respect to the slide-wire. Connected for energization from the source 13 in series with the rheostat 14, and in parallel with the series combination of resistors 10, 11 and 12 is a series combination of two resistors 17 and 18, their junction providing a point of reference potential, whence electrical connection is made to one terminal of a detector amplifier-motor device 19 provided with suitable mechanical connecting means 20 whereby said device may be caused to adjust the position of the contact member 15 along the slide-wire 10. A conductor 21, flexibly connected to the movable contact member 15 and a conductor 22 connected to the free terminal of the detector device 19 constitute the terminals of the measuring network and are connected as hereinafter to be set forth to the source of electromotive force to be measured. The apparatus as thus far described, and for which no invention is claimed, represents generally a self balancing potentiometer, of which many forms and types are known to those versed in the art, and which is well exemplified in U. S. Letters Patent No. 2,320,066, granted May 25, 1943, to F. B. Bristol, and in Patent No. 2,444,726, granted July 6, 1948, to W. H. Bussey.

To utilize the hereinbefore described apparatus as a multiple-point thermocouple pyrometer, there is provided a suitable dial-switch 25, shown in part in both Figs. 1 and 2. This switch is provided with two concentrically disposed circular rows of contact studs $P_1$, $P_2$, $P_3$, etc. and $Q_1$, $Q_2$, $Q_3$, etc., adapted to be simultaneously engaged by two mutually insulated contact arms 26 and 27 integrally mounted for angular displacement about a pivot bearing concentric with said rows of contacts. The extremities of said contact arms remote from the contact studs engage respectively a pair of stationary mutually insulated conducting rings 28 and 29.

In order that the characteristics of the prior art be fully understood, consideration may be given to Fig. 1 of the drawings, wherein is shown the conventional manner of combining the described dial switch and potentiometer to render the latter selectively responsive to electromotive forces developed in a plurality (in the present instance, three) of thermocouples exposed to temperatures to be individually measured. Thermocouples $T_1$, $T_2$ and $T_3$, each formed of suitable materials, e. g., iron and constantan, are separately connected, each by means of two conductors to the contact studs of the switch 25. The respective elements of the couple $T_1$ are connected to the studs $P_1$—$Q_1$, the elements of couple $T_2$ to studs $P_2$—$Q_2$, and $T_3$ to $P_3$—$Q_3$. It will be understood that the interconnecting conductors between the couples and the studs are either formed of the same materials as the couple elements to which they are respectively connected, or else of such materials as will maintain at a zero value the net thermoelectromotive force due to their connection to said elements. The latter expedient is fully set forth and described in U. S. Letters Patent No. 1,169,611, granted January 25, 1916, to W. H. Bristol. Connection is made between the contact ring 28 and the conductor 21 by an interposed conductor 31 and between the ring 29 and the conductor 22 by an interposed conductor 32. The metals comprising the several interconnecting conductors are designated in the drawing as $a$ and $b$; and it will be observed that in the apparatus shown in Fig. 1 the conductors 31 and 32 connecting the dial switch to the measuring network are comprised of the same combination of materials as the leads between the thermocouples and the contact studs of the dial switch. It is assumed that the measuring system is comprised of materials developing no appreciable thermoelectric effects within the network and the conductors 21 and 22, forming the "input" terminals thereof, are of mutually identical material—presumably copper.

Thus, the junctions of the conductors 21 and 22 to the conductors 31 and 32 comprise the reference, or "cold" junctions of the measuring system; and in order to correct for ambient temperature effects it has been customary to provide the following compensating structure: The resistor 18, instead of being comprised of constant-resistance material as are the other resistors in the bridge network, is formed of temperature-sensitive metal, such as copper or nickel, wound on a spool and having embedded therein the junctions between the conductors 21—31 and 22—32, respectively whereby to maintain said resistors and said junctions at substantially a common temperature. (For purposes of clarity in the drawings, the common mounting of the resistance spool and the reference junctions is indicated as a temperature-equalizing enclosure 33.) By suitably proportioning the characteristics of the temperature-sensitive resistor 18 to those of the embedded junctions, changes in its value with temperature variations may be caused to shift the potential of its point of connection to the fixed resistor 17 to compensate for such temperature variations, rendering the position assumed by the contact member 15 in order to balance the network a true measure of the temperature to which the associated one of the couples $T_1$, $T_2$, $T_3$, is exposed. In order to differentiate clearly among the materials in the circuit external to the measuring network proper, the conductors 21 and 22, presumably of copper, are in the diagram designated $c$. Should one of the thermoelectric elements be of copper, as is not uncommon, it will be apparent that there will be only one reference junction requiring to be thermally associated with the resistor 18.

In considering the performance of the compensating system shown in Fig. 1, the following characteristics will be apparent: (1) the conductors 31 and 32 between the dial switch and the compensating spool 18 must be of the same combination of materials as the leads from the measuring couples to the contact studs of the switch. Thus, in manufacturing instruments for stock, it becomes necessary that this part of the internal wiring be left incomplete until the final specification is available. Moreover, should it be found necessary to change from one to another type of couple in the field, the original wiring must be removed and replaced by conductors consistent with the materials of the substituted couples. (2) Because the thermocouple materials are led to the studs of the selector switch, while the contact rings are connected to the measuring network by copper leads, the system will be subject to thermoelectric effects due to possible temperature gradients in the switch structure.

In order to obtain an understanding of the structure whereby the purposes of the present invention are accomplished, attention may now be given to Figs. 3, 4, 5 and 6 of the drawings, which are different views of a compensator including a temperature-equalizing mounting adapted to contain a resistance winding 18a (replacing the resistor 18 of Fig. 1) and to maintain the same at a common reference temperature with a group of thermo-junctions comprising the "cold ends" of a multiple point thermoelectric measuring system. A spider 39 is formed of a cylindrical block of aluminum or other temperature-conducting material, having therethrough a central bore or cavity 40 to contain a spool 41 carrying the resistance winding 18a, and having disposed about its periphery a plurality of deep axial slots or cavities 42 adapted to enclose the several thermojunctions comprising the "cold ends" of the system. The spider 39 may be of cast metal, or may be shaped by machining operations, or may be formed from extruded stock, or may be built up of laminations carried by a central cylindrical tube, or may be crimped from tubular stock, or may be produced by any one of other well known methods readily adaptable to manufacture on a quantity basis.

The spool 41 contained within the bore 40 is formed preferably of metal having a high thermal conductivity, and carries at its inner extremity a metal spring-washer 43 adapted to engage the inner wall of the bore 40 to provide free heat interchange between said spool and the spider 39. To the outer extremity of the spool 41 is attached a cylindrical block 44 of insulating material having a reduced portion adapted freely to enter the bore 41 and a shoulder portion to limit the degree of said entry. A slot 45 is transversely formed in the reduced portion of the block 44. A pair of electrical conductors 46 and 47 penetrate said block axially from the exterior to the slot 45, where they are suitably joined to the extremities of the resistance winding 18a carried by the spool 41.

Attention may now be directed to Fig. 6, wherein is shown, partly in section, the general construction of a "cold junction" 49 especially adapted to the purposes of the invention. Two conductors 50 and 51, formed of thermoelectric metals are compactly and securely joined to a third conductor 52, as by welding, soldering or suitable mechanical clamping means. The materials of the several conductors forming the junction may conveniently be distinguished by providing the same with suitably colored insulating coverings. The junction proper is provided with a thin layer of suitable electrical insulation, as by enclosing the same in a short piece of flexible plastic sleeving 48.

While, of course, the selection of materials of the several conductors entering into the junctions will be governed by the materials which it has been found expedient to use in the measuring thermocouples, a survey of industrial practices shows a predominating use of either a copper/constantan, or an iron/constantan combination. On this assumption, a very large proportion of installation conditions can be met by the use of two types of compensating junctions in combination, one, as that shown in Fig. 6, having the conductors 50 and 52 formed of copper and the conductor 51 of constantan, and the other having the constantan conductor 51 replaced by a conductor of iron. This will be made more clear by consideration of the complete assembly, as shown in Figs. 3 and 4. In one of the slots 42 of the spider 39 is placed, for example, the described junction of conductors 50, 51 and 52, and also a similar junction of conductors 53, 54 and 55, conductors 53 and 55 being of copper and conductor 54 of iron. Similar junction combinations are placed in the others of the slots 42, Fig. 4 showing an assembly including nine of a possible sixteen pairs of junctions in place in their respective slots.

The spider 39 with its embedded junctions is placed within a cylindrical metal shell 60 of materially greater diameter and length than the spider, and is secured in place in said shell as by means of flat plates 61 of insulating material symmetrically placed about the spider within the annular space between the same and the shell 60, said plates being so dimensioned as to be slightly bowed and to exert sufficient radial force to maintain said spider substantially centrally within the shell 60, and free of metallic contact therewith.

The block 44 with the spool 41 is inserted within the bore 40 from one end; and said block may be provided with a collar 63 formed of insulating material loosely encircling the reduced portion of said block, to bear upon the end of the spider 39, and, cooperating with the shoulder portion of said block, to establish definitely the axial location of the spool when inserted within the spider 39.

Within the end of the bore 40 opposite the spool assembly is inserted a plug 65 formed of insulating material and provided with a spring washer 66 adapted to engage electrically the inner wall of the bore 40. A conductor 67 penetrating the plug 65 is electrically connected to the washer 66, thereby providing means whereby the spider 39 may be connected to ground, or may be maintained at any other desired electrical potential.

The assembly is completed by fitting annular insulating washers 68 over the ends of the space between the spider 39 and the shell 60 (or otherwise substantially isolating said space) and filling each end of the shell extending beyond the spider with molten wax or "potting compound" 69, whereby upon solidification of the same, the whole assembly will be integrated into a structural unit. It will be observed, however, that the collar 63, being a loose fit on the reduced portion of the block 44, and being retained by the compound 69, may be utilized as a permanent seat for the shoulder portion of said block, thus permitting easy removal of the resistance spool, and its replacement by other units having equivalent physical dimensions. The end view of the assembly, as seen in Fig. 5, shows the general arrangement of the conductors as they emerge from the insulating compound. An examination of the structure of the assembly as thus far described shows that there has been effected a maximum provision for equalization of temperature between the several "cold junctions" and the resistance winding 18a, with a minimum possibility of establishment of temperature gradients in said structure as the result of variations in ambient temperature.

Attention may now be directed to Fig. 2, wherein is shown the manner of incorporating into the circuit of a multiple-point thermoelectric measuring system a cold-end compensator embodying the structure and principle of the invention. The measuring network is that fully described in the discussion of the prior art as exemplified in Fig. 1, the sole difference lying in the substitution of the temperature-sensitive resistor 18a for the equivalent element 18 of Fig. 1. The shell 60 of the compensator is designated as an enclosed rectangle, and within it are shown disposed the resistance winding 18a and three sets of the hereinbefore described "cold junctions," one set having its copper leads 52 and 55 connected respectively to the contact studs $P_2$ and $Q_2$ of the dial switch 25. It being assumed that the thermocouples $T_1$, $T_2$ and $T_3$ have elements formed respectively of the same metals, e. g. constantan and iron, as the conductors 51 and 54, said conductors will be connected to the elements of one of said couples, e. g. $T_2$, thus completing the inter-connection from the couple $T_2$ through the compensating device to the multiple-point switch 25. Couples $T_1$ and $T_3$ are connected in an identical manner to corresponding studs in the dial-switch; and the measuring circuit is completed by connecting the conductors 21 and 22 respectively to the contact rings 28 and 29 of said switch. It will be noted that the conductors 50 and 53, which have been described as of copper, are shown in Fig. 2 as not serving to complete any electrical circuit; and it will be understood that one of these would have been used only in the event of one of the elements of the corresponding measuring couple being of copper. In brief, while each of the "cold junctions" in the compensating device may incorporate conductors of a variety of materials, in any particular installation use will be made only of those leads whose material combination, or whose mutual thermoelectric effect, is identical with that of the couple to which they are connected. The characteristics of the temperature-sensitive resistance spool 18a are made consistent with those of the thermoelectric combination with which it is to be used (see U. S. Patent No. 1,209,372, granted to Wunsch, December 19, 1916); and for each couple combination a suitable spool will be selected and placed within the bore of the spider 39. Should it be required to utilize the instrument as an uncompensated potentiometer, for the determination of electrical potential, as when used with thermal converters in the measurement of electric power, the resistor 18a is selected of constant-resistance material, and only the copper leads of the embedded junctions are connected in the measuring circuit. (It will be understood that in any installation the unused leads of the compensator will be left open-circuited and taped back out of the way.)

Inspection of the diagram shown in Fig. 2 demonstrates the following clear distinctions from that of Fig. 1.

(1) Instead of a single set of "cold junctions" in a common connection from the multiple-point selector-switch to the measuring network, the improved form has a separate set of junctions for each couple. (2) Instead of the compensator cold junctions being interposed between the selector switch and the measuring circuit the switch is directly connected to the network. (3) All conductors connected to the studs and to the contact rings of the selector switch are of the same material—presumably copper.

The above-enumerated features, together with others mentioned in the foregoing specification, make clear the fact that the present invention is characterized by the following advantages:

Compensating units may be made up as standard parts for the manufacturer's stock, and incorporated in the basic assembly of multiple-point instruments. Then, as instruments are assembled for individual orders, it is necessary only to determine the compensating spool to be used with the specified couple combination, insert it in the compensator, and select the corresponding compensator terminal wires for connection to the couples.

Similarly, in the event of it being found desirable to make a field change from couples of one combination of metals to those of another type, proper compensation can be made by withdrawing one spool assembly from the central cavity in the spider and replacing it with that suited to use with the new couples, and reconnecting the compensator leads without disturbing the internal wiring of the instrument. These last-named characteristics facilitate reduction of inventory on the part of the manufacturer and the sales organization, and at the same time simplify the user's practices and reduce his required stock of spare components in adapting his recorders to a variety of applications.

It has also been pointed out that the structure of the compensating device facilitates close and continuous equalization of temperature between the reference junctions in the thermoelectric circuit and the compensating resistor in the measuring network. It has further been made clear that the elimination of junctions of dissimilar metals in the selector switch removes a serious source of objectionable thermal effects known to characterize the prior art.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a cold-junction compensator for a temperature determining system having thermojunctions exposed to temperatures to be determined, an electric circuit for the same, and a measuring network for determining the electric potentials in said circuit, the combination of a thermally conducting structure having therein cavities in mutual heat-exchange relation, a temperature-variable impedance element for inclusion in said network and selectively adapted for insertion in one of said cavities, and reference thermo-junctions adapted to be embedded in other of said cavities in close thermally coupled relation with said impedance element, each of said last named junctions comprising a plurality of thermoelectrically different materials with at least three terminal conductors whereby selected combinations of said materials may be included in said electric circuit.

2. In a cold-junction compensator for a temperature-determining system having thermojunctions exposed to temperatures to be determined, an electric circuit for the same, and a measuring network for determining the electric potentials in said circuit; the combination of a thermally conducting structure having a cavity, a wall surrounding the same, and a plurality of radially-extending cavities disposed in said wall around the first-mentioned cavity, a temperature-variable impedance element for inclusion in said network and adapted for insertion in said first-mentioned cavity, and reference thermojunctions adapted to be embedded in said radially-extending cavities, each of said last-named junctions comprising a plurality of thermoelectrically different materials with terminal conductors whereby selected combinations may be included in said electric circuit.

3. In a cold-junction compensator for a temperature-determining system having thermojunctions exposed to temperatures to be determined, and a measuring network for determining the electric potentials in said thermojunctions; the combination of a thermally conducting structure having a central cavity, a wall surrounding said central cavity, and a plurality of radially-extending cavities disposed in said wall around said central cavity, a temperature-variable impedance element connected in said network and removably mounted in said central cavity, reference thermojunctions mounted in said radially extending cavities, each of said last-named junctions comprising a plurality of thermoelectrically different materials with terminal conductors whereby selected combinations may be connected to said exposed thermojunctions in conformity with the materials forming the same, and a conducting shell enclosing said structure and thermally insulated therefrom.

4. In a cold-junction compensator for a temperature-determining system having thermojunctions exposed to temperatures to be determined, and a measuring network for determining the electric potentials in said thermojunctions; the combination of a thermally conducting structure having a cavity extending in a direction axially of said structure, a wall surrounding said cavity, and a plurality of radially-extending cavities in said wall, a temperature-variable impedance element connected in said network and removably mounted in the first-mentioned cavity, and reference thermojunctions in said radially-extending cavities and connectible to said exposed thermojunctions, and means connecting said reference thermojunctions selectively to said measuring circuit.

5. In an apparatus for selectively determining temperatures at any one of a plurality of discrete points embodying a single electrical measuring network, a plurality of electrically symmetrical thermoelectric-couple circuit branches each comprising a reference junction and an individual junction in series therewith exposed to the temperature to be determined, means for compensating said network for the temperature of each of said reference junctions, said means comprising a unitary thermally conducting structure having a cavity substantially centrally formed therein, a massive wall surrounding said cavity and having a plurality of radially-extending cavities formed in said wall about said first mentioned cavity and for receiving said reference junctions therein in intimate heat-exchange relationship with said wall, said wall being exposed to ambient temperature conditions, a temperature-sensitive impedance element electrically connected in said network and physically adjacent but electrically remote from all said reference junctions, and a thermally conductive member carrying said impedance element and removably seated therewith within said first mentioned cavity in close heat-exchange relationship with said wall.

(References on following page)

References Cited in the file of this patent

UNITED STATES PATENTS

| | | |
|---|---|---|
| 1,144,688 | Brown | June 29, 1915 |
| 1,228,678 | Johnson | June 5, 1917 |
| 1,643,668 | Linblad | Sept. 27, 1927 |
| 1,695,867 | Stickney | Dec. 18, 1928 |
| 2,072,312 | Obermaier | Mar. 2, 1937 |
| 2,250,712 | Johnson | July 29, 1941 |
| 2,475,238 | Hall et al. | July 5, 1949 |

FOREIGN PATENTS

| | | |
|---|---|---|
| 993,132 | France | July 18, 1951 |